United States Patent
Wada et al.

(10) Patent No.: US 7,055,959 B2
(45) Date of Patent: Jun. 6, 2006

(54) PROJECTION DISPLAY DEVICE AND BACK PROJECTION DISPLAY DEVICE USING THE DISPLAY DEVICE

(75) Inventors: Mitsuhiro Wada, Katano (JP); Yoshihiro Masumoto, Kobe (JP); Yoshimasa Fushimi, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/485,898

(22) PCT Filed: Sep. 27, 2002

(86) PCT No.: PCT/JP02/10124

§ 371 (c)(1),
(2), (4) Date: Feb. 4, 2004

(87) PCT Pub. No.: WO03/032048

PCT Pub. Date: Apr. 17, 2003

(65) Prior Publication Data

US 2004/0201824 A1  Oct. 14, 2004

(30) Foreign Application Priority Data

Oct. 1, 2001 (JP) .............................. 2001-305018

(51) Int. Cl.
G03B 21/20 (2006.01)
G03B 21/22 (2006.01)

(52) U.S. Cl. ........................................ 353/77; 353/102

(58) Field of Classification Search ................. 353/34, 353/74–75, 77, 119, 102; 348/840, 841
See application file for complete search history.

(56) References Cited

U.S. PATENT DOCUMENTS

| 6,059,413 | A | * | 5/2000 | Okubo | 353/77 |
| 6,118,501 | A | | 9/2000 | Ohzawa | 349/5 |
| 6,129,437 | A | | 10/2000 | Koga et al. | 353/98 |
| 6,322,219 | B1 | | 11/2001 | Okamori et al. | 353/98 |
| 6,491,398 | B1 | * | 12/2002 | Takeuchi et al. | 353/31 |
| 6,588,908 | B1 | * | 7/2003 | Shimizu | 353/81 |
| 6,688,748 | B1 | * | 2/2004 | Lewis et al. | 353/69 |
| 6,715,880 | B1 | * | 4/2004 | Shouji | 353/20 |
| 6,851,811 | B1 | * | 2/2005 | Akiyama | 353/31 |
| 6,935,752 | B1 | * | 8/2005 | Jeon | 353/99 |
| 2005/0046810 | A1 | * | 3/2005 | Nakamura | 353/102 |

FOREIGN PATENT DOCUMENTS

CN  1248718  3/2000

(Continued)

Primary Examiner—Christopher Mahoney
(74) Attorney, Agent, or Firm—Hamre, Schumann, Mueller & Larson, P.C.

(57) ABSTRACT

A projection display apparatus includes a light source (1), an illumination system (8), a reflection system (9), a reflection-type light modulator (10), a lens element (11), and a projection system (12). The optical axis (8a) of the illumination system (8) and the optical axis (12a) of the projection system (12) are skew lines. The lens element (11) allows the exit pupil (8b) of the illumination system (8) to be conjugated substantially with the entrance pupil (12b) of the projection system (12). Thus, the reflection-type light modulator (10) and the projection system (12) can be arranged coaxially. Moreover, mechanical contact or interference between the optical components can be eliminated, and the space can be utilized efficiently. This configuration can provide an inexpensive compact projection display apparatus using a reflection-type light modulator.

10 Claims, 15 Drawing Sheets

FOREIGN PATENT DOCUMENTS

| | | |
|---|---|---|
| JP | 9-171150 | 6/1997 |
| JP | 10-307277 | 11/1998 |
| JP | 2000-39585 | 2/2000 |
| JP | 2000-98272 | 4/2000 |
| JP | 2000-275572 | 10/2000 |
| JP | 2001109062 A * | 4/2001 |
| JP | 2001-133883 | 5/2001 |
| JP | 2001-166118 | 6/2001 |
| WO | WO 01/33865 A1 * | 5/2001 |

* cited by examiner

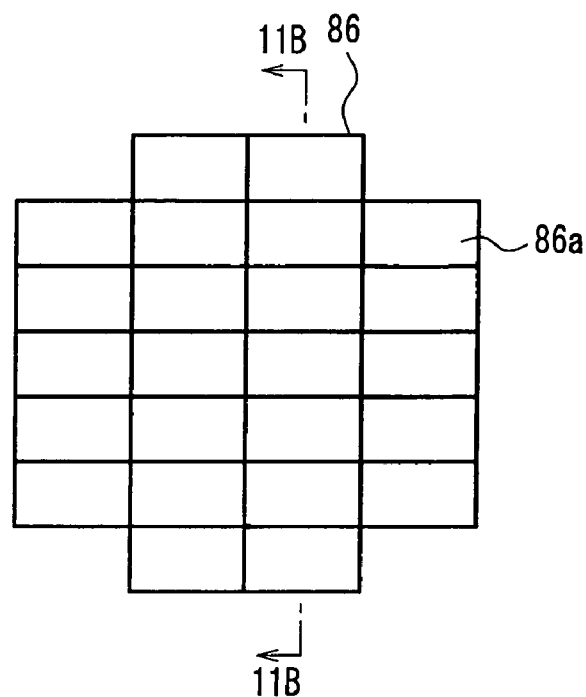 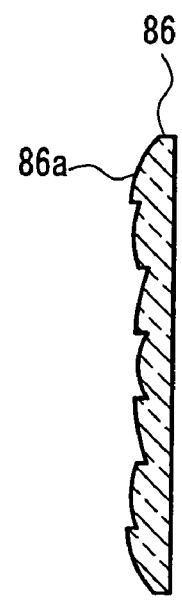
FIG. 11A    FIG. 11B
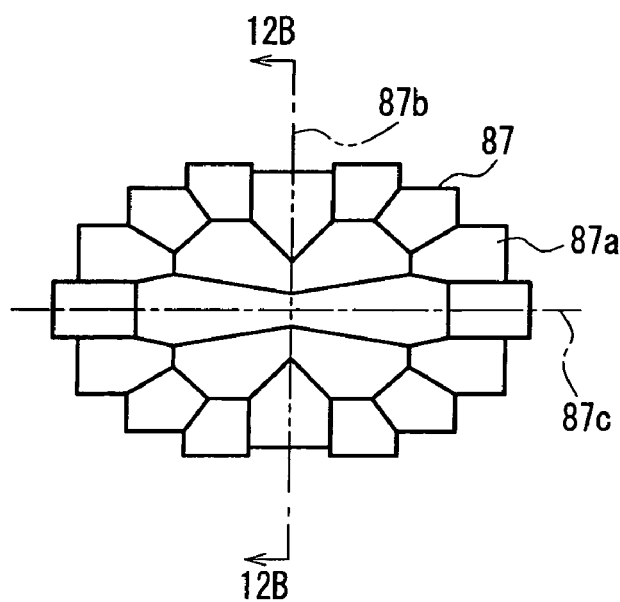 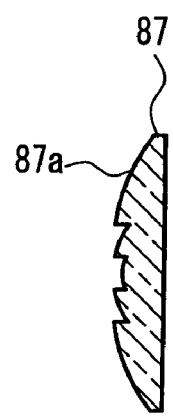
FIG. 12A    FIG. 12B

PROJECTION DISPLAY DEVICE AND BACK PROJECTION DISPLAY DEVICE USING THE DISPLAY DEVICE

TECHNICAL FIELD

The present invention relates to a projection display apparatus that can project a large-screen image onto a screen by using a reflection-type spatial light modulator, and a rear-projection display apparatus.

BACKGROUND ART

Projection display apparatuses using various types of spatial light modulators conventionally are known as large-screen image equipment. Recently, a reflection-type spatial light modulator with high display efficiency such as DMD (digital micro-mirror device) has been receiving attention (e.g., JP 2000-98272 A).

FIGS. 16A and 16B show the configuration of a projection display apparatus using a DMD as a spatial light modulator. FIG. 16A is a top view of the apparatus, and FIG. 16B is a side view thereof. This projection display apparatus includes the following: a lamp 161 for emitting white light; an elliptical mirror 162 for condensing the emitted light of the lamp 161; a rotating color filter 164 that is located in the vicinity of a long focus of the elliptical mirror 162 and selectively transmits three primary colors (red, green, and blue) of light in sequence; a focusing lens 165; a plane mirror 166; a DMD 167 for modulating incident light to form an optical image; and a projection lens 168 for magnifying and projecting the optical image formed on the DMD 167 onto a screen (not shown).

As the lamp 161, e.g., a super-high pressure mercury lamp or xenon lamp may be used. These lamps provide high brightness with a relatively small light-emitting portion, so that the emitted light can be condensed efficiently. The focusing lens 165 suppresses the divergence of light that has passed through the rotating color filter 164 and directs the light toward the DMD 167 and the projection lens 168.

FIG. 17A is a schematic front view of the DMD 167. FIG. 17B is a schematic side view showing the principle of operation of small mirrors 171 on the DMD 167. As shown in FIG. 17A, the DMD 167 includes a two-dimensional array of small mirrors 171 that are provided for each pixel. The inclination of the individual small mirrors 171 is controlled by the electrostatic effect of memory devices located directly under the small mirrors 171 so that a reflection angle of the incident light is changed for each pixel, thereby producing the ON/OFF states.

FIG. 17B illustrates a condition in which a small mirror 171 is inclined at ±10 degrees with respect to the plane of the DMD 167. For incident light 172 that tilts 20 degrees from a normal to the plane of the DMD 167, when the small mirror 171 is in the ON (+10 degrees) state, reflected light 173 enters the projection lens 168, and a pixel is displayed on the screen. When the small mirror is in the OFF (−10 degrees) state, reflected light 174 does not enter the projection lens 168, and a pixel is not displayed on the screen. It is possible to express the gray scale by temporally controlling the ON/OFF switching of each pixel.

Each of the mirrors 171 on the DMD 167 is rotated in a plane that forms an angle of 45 degrees with a minor axis 176 of the display area (this angle is referred to as "bearing angle" in the following), as shown in FIG. 17A.

To ensure appropriate operation of the DMD 167 and to avoid mechanical contact or interference between the optical components such as the focusing lens 165 and the projection lens 168, the plane mirror 166 is arranged so that the optical path of light emanating from the focusing lens 165 bends three-dimensionally and the light enters the DMD 167 at a predetermined incident angle, as shown in FIGS. 16A and 16B.

A central axis (a normal passing through the center of an effective portion in the DMD 167) 167a of the DMD 167 does not coincide with an optical axis 168a of the projection lens 168, but is offset (shifted) from the optical axis 168a. Therefore, the projection lens 168 uses only part of the field angle of an image circle for projecting an optical image formed on the DMD 167.

However, the projection display apparatus as shown in FIGS. 16A and 16B has the following problems.

First, the central axis 167a of the DMD 167 is offset from the optical axis 168a of the projection lens 168, so that excess space is necessary in the height direction, making it difficult to reduce the size of the whole apparatus.

Second, when this apparatus is used in a rear-projection display apparatus, the optical axis 168a of the projection lens 168 is offset from the central axis of a projected image. Therefore, the central axis (a normal passing through the center of an effective portion of a screen) of a transmission-type screen that is held by a cabinet also should be offset from the optical axis 168a of the projection lens 168. Accordingly, the field angle increases in proportion to the amount of offset, which in turn increases not only the size of the projection lens 168, but also the angle of incidence of light on a Fresnel lens of the screen. Thus, flare or stray light is increased on the periphery of the screen, and the display images have poor quality.

Moreover, the field angles with respect to the most peripheral portions (four corners) of the screen differ from one another, resulting in nonuniform resolution or brightness on the screen.

Therefore, a projection system using right projection (non-offset) is suitable for the rear-projection display apparatus.

In contrast, a configuration that can achieve right projection by using a DMD has been proposed (e.g., JP 2001-166118 A).

According to this configuration, a TIR (total internal reflection) prism consisting of two or three pieces of prism is arranged between a projection lens and a DMD. Then, total reflection generated between the air gaps of each piece of prism is utilized to achieve right projection.

However, one side of a projected image can be blurred if there is nonuniformity in the air gaps of the TIR prism, so that extremely strict accuracy is required. Moreover, the TIR prism is a very expensive component and thus increases the cost of the whole apparatus.

DISCLOSURE OF INVENTION

Therefore, with the foregoing in mind, it is an object of the present invention to provide a small inexpensive projection display apparatus that can achieve high-uniformity display images and right projection by using a reflection-type light modulator such as DMD, and a rear-projection display apparatus using the projection display apparatus.

A projection display apparatus of the present invention includes the following: a light source; an illumination system for condensing light emitted from the light source into illumination light; a reflection system for bending an optical path of the illumination light; a reflection-type light modulator that is illuminated with the illumination light bent by the reflection system and forms an optical image in accordance with an image signal; a projection system for projecting the optical image formed on the reflection-type light modulator; and a lens element arranged on optical paths of incident light and exit light of the reflection-type light modulator. The optical axis of the illumination system and the optical axis of the projection system are skew lines. The lens element allows the exit pupil of the illumination system to be conjugated substantially with the entrance pupil of the projection system.

A rear-projection display apparatus of the present invention includes the projection display apparatus of the present invention, a transmission-type screen for displaying an image projected by the projection display apparatus, and a cabinet for housing the projection display apparatus and holding the transmission-type screen.

BRIEF DESCRIPTION OF DRAWINGS

FIG. 11A is a front view of a first lens array in a projection display apparatus according to Embodiment 3 of the present invention, and FIG. 11B is a cross-sectional view taken along the line 11B—11B in FIG. 11A.

FIG. 12A is a front view of a second lens array in a projection display apparatus according to Embodiment 3 of the present invention, and FIG. 12B is a cross-sectional view taken along the line 12B—12B in FIG. 12A.

BEST MODE FOR CARRYING OUT THE INVENTION

Figure 1:
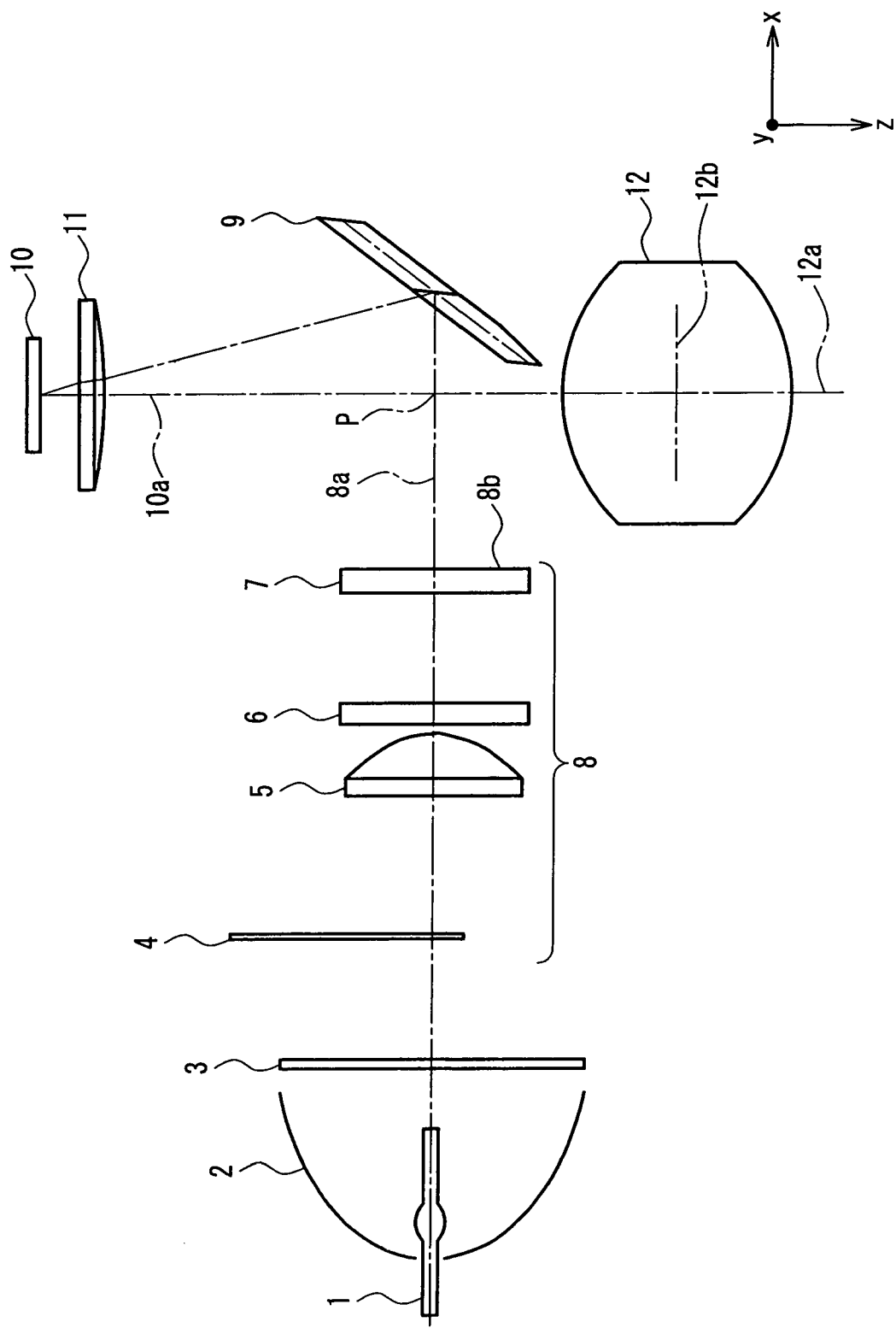
FIG. 1 is an x-z plan view showing the configuration of a projection display apparatus according to Embodiment 1 of the present invention.

In a projection display apparatus of the present invention, the optical axis of the illumination system and the optical axis of the projection system are skew lines, and the lens element allows the exit pupil of the illumination system to be conjugated substantially with the entrance pupil of the projection system. Thus, the projection display apparatus can achieve a small size, low cost, and right projection by using a reflection-type light modulator.

In the present invention, the geometric relationship between the optical axis of the illumination system and the optical axis of the projection system is expressed by skew lines, which means that the two optical axes do not lie in the same plane, i.e., the two optical axes are not parallel while they do not intersect.

In the projection display apparatus of the present invention, it is preferable that the entrance pupil is eccentric with respect to the optical axis of the projection system.

In this case, it is preferable that a converging angle in the eccentric direction of the projection system is smaller than a converging angle in the direction perpendicular to the eccentric direction.

It is preferable that the projection system includes a focus adjusting mechanism that does not rotate around the optical axis of the projection system.

In the projection display apparatus of the present invention, it is preferable that when viewed from the direction perpendicular to both the optical axis of the illumination system and the optical axis of the projection system, an apparent point of intersection of the optical axis of the illumination system and the optical axis of the projection system is located between the lens element and the projection system.

It is preferable that the optical axis of the reflection-type light modulator coincides with the optical axis of the projection system.

It is preferable that the projection display apparatus of the present invention further includes a first cabinet and a second cabinet. The first cabinet may hold the illumination system and include an exit window through which light emanating from the illumination system passes. The second cabinet may hold the reflection system, the reflection-type light modulator, the lens element, and the projection system and include an entrance window through which light from the illumination system enters. The exit window and the entrance window may be coupled together.

In this case, it is preferable that a coupling member is provided between the exit window and the entrance window, and the coupling member includes an adjusting mechanism for adjusting an optical axis or optical path length.

In the projection display apparatus of the present invention, the illumination system preferably includes an optical integrator element.

In this case, it is preferable that the optical integrator element includes two lens array plates, and each of a plurality of lenses that constitute at least the lens array plate located closer to the light source is decentered appropriately.

Next, a first rear-projection display apparatus of the present invention includes the projection display apparatus of the present invention, a transmission-type screen for displaying an image projected by the projection display apparatus, and a cabinet for housing the projection display apparatus and holding the transmission-type screen. This rear-projection display apparatus can display images with high quality and high uniformity in brightness or resolution.

A second rear-projection display apparatus of the present invention includes a plurality of projection display apparatuses of the present invention, transmission-type screens for displaying images projected by the projection display apparatuses, and a cabinet for housing the projection display apparatuses and holding the transmission-type screens. This rear-projection display apparatus can perform multi-screen display with high image quality and a small difference in image quality between the screens.

It is preferable that the first and second projection display apparatuses include a field stop on the transmission-type screen side.

Hereinafter, specific embodiments of a projection display apparatus and a rear-projection display apparatus of the present invention will be described with reference to the drawings.

EMBODIMENT 1

FIG. 1 shows the configuration of a projection display apparatus of Embodiment 1 of the present invention. Reference numeral 1 denotes a lamp as a light source, 8 denotes an illumination system, 9 denotes a reflection mirror as a reflection system, 10 denotes a DMD as a reflection-type light modulator, 11 denotes a planoconvex lens as a lens element, and 12 denotes a projection lens as a projection system.

Figure 2:
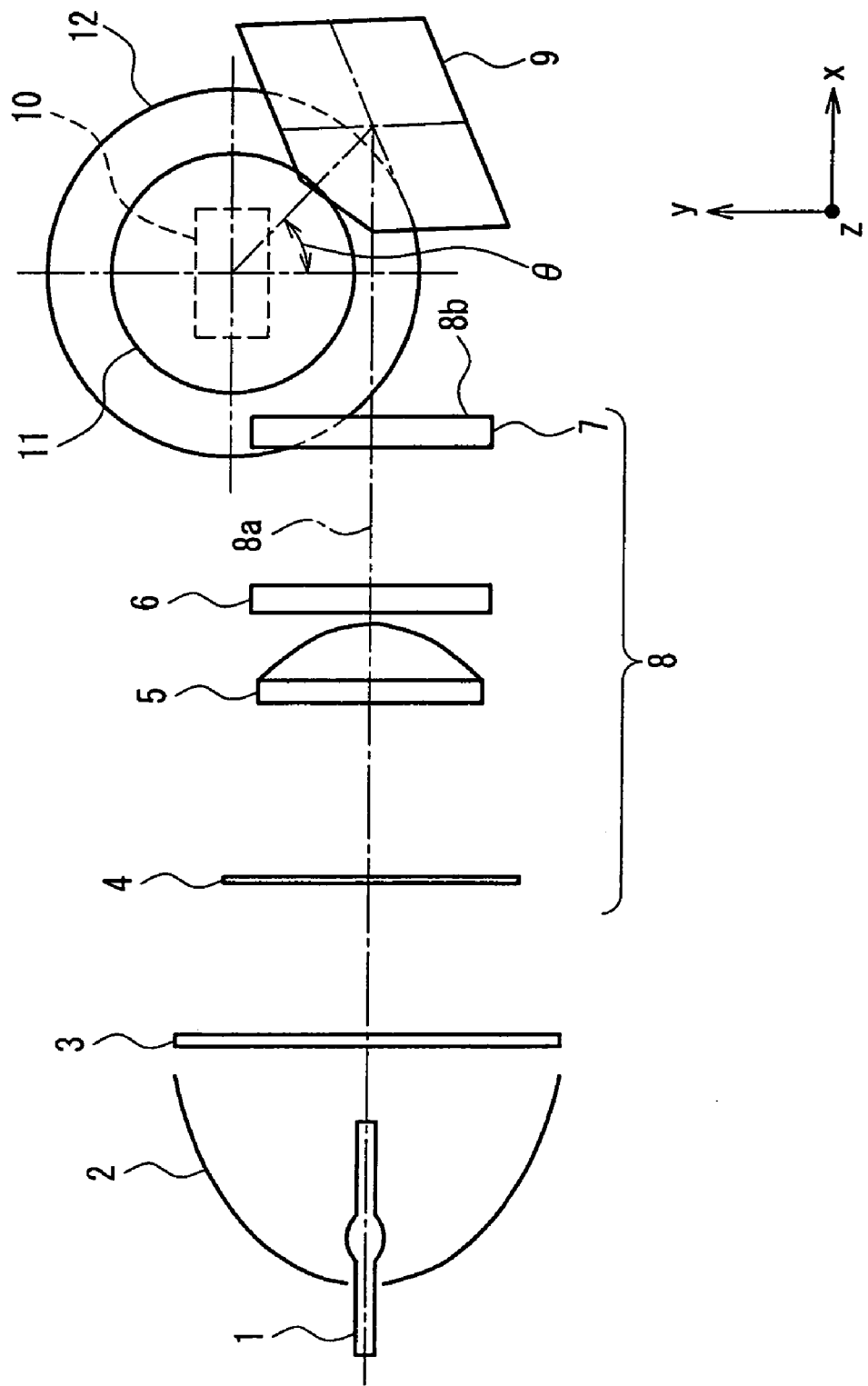
FIG. 2 is an x-y plan view showing the configuration of a projection display apparatus according to Embodiment 1 of the present invention.
Figure 3:
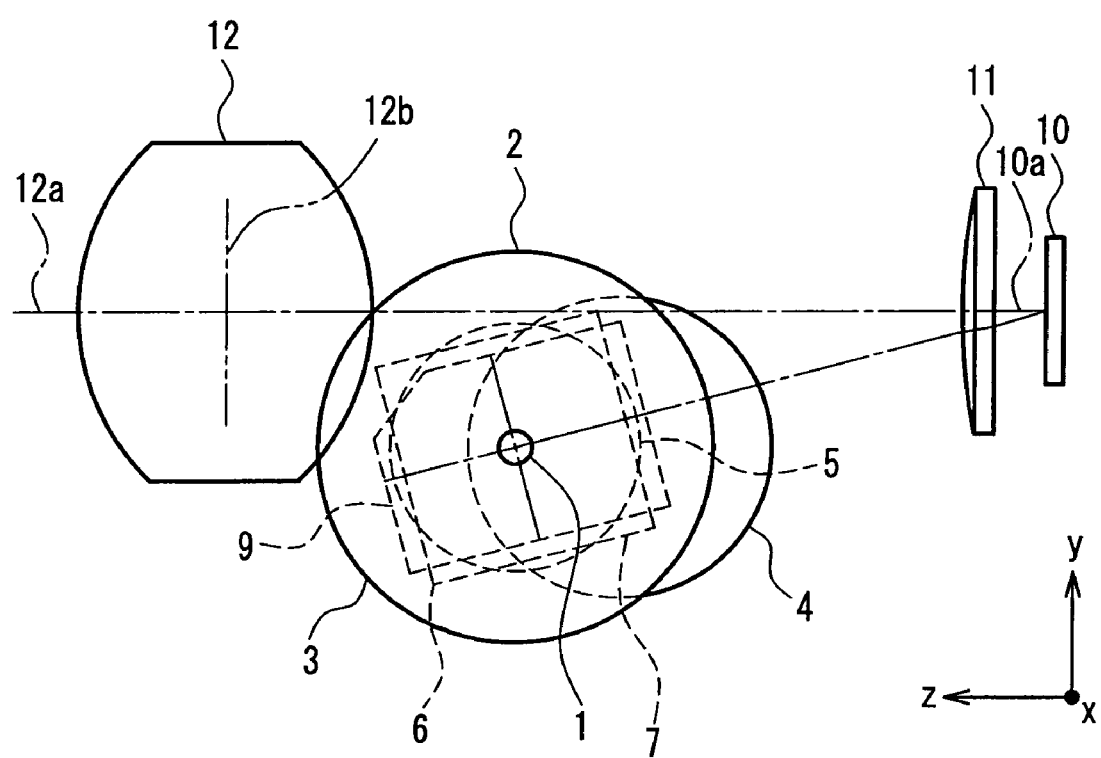
FIG. 3 is a y-z plan view showing the configuration of a projection display apparatus according to Embodiment 1 of the present invention.

When an xyz rectangular coordinate system is defined as shown in the drawings, FIG. 1 illustrates the configuration taken along the x-z plane. Similarly, FIGS. 2 and 3 illustrate the configurations taken along the x-y plane and the y-z plane, respectively.

An elliptical mirror 2 condenses emitted light of the lamp 1 and forms a focusing spot in the vicinity of the long focus. A UV-IR cut filter 3 removes ultraviolet and infrared light components from the emitted light of the lamp 1.

The illumination system 8 includes a rotating color filter 4, a condenser lens 5, a first lens array 6, and a second lens array 7.

The rotating color filter 4 is formed by combining three primary color filters into a disk. The rotating color filter 4 is located in the vicinity of the focusing spot and is rotated so as to selectively transmit red, green, and blue colors of light in sequence.

The condenser lens 5 condenses divergent light that has passed through the rotating color filter 4 and directs it efficiently toward the first lens array 6.

The first lens array 6 and the second lens array 7 are optical integrator elements. The first lens array 6 divides the beam condensed by the condenser lens 5 into small beams. The second lens array 7 magnifies each of the small beams and superimposes them on the DMD 10. Thus, a uniform illumination beam is formed on the DMD 10 as an integral value of the small beams.

Figures 4A, 4B:
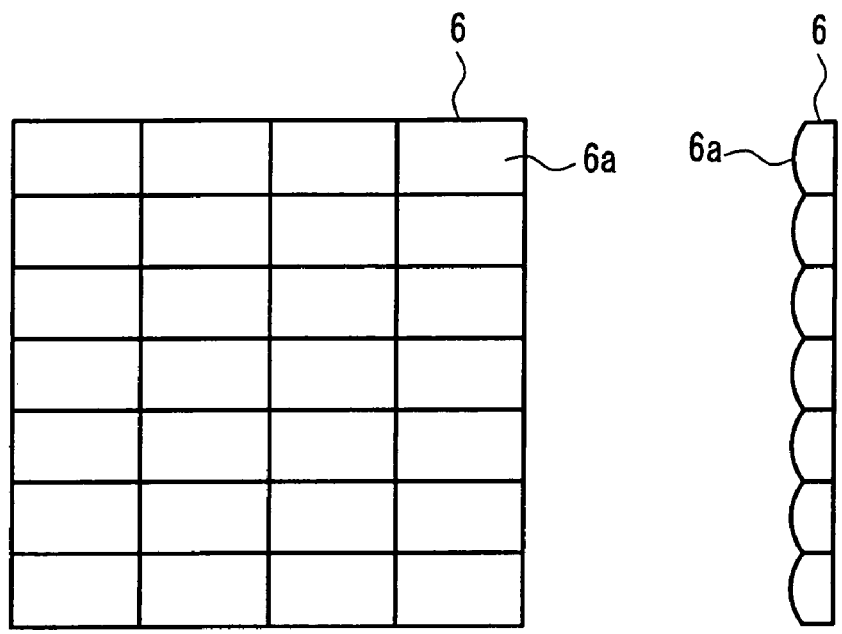
FIG. 4A is a front view of a first lens array in a projection display apparatus according to Embodiment 1 of the present invention.
FIG. 4B is a side view of the first lens array.
Figures 5A, 5B:
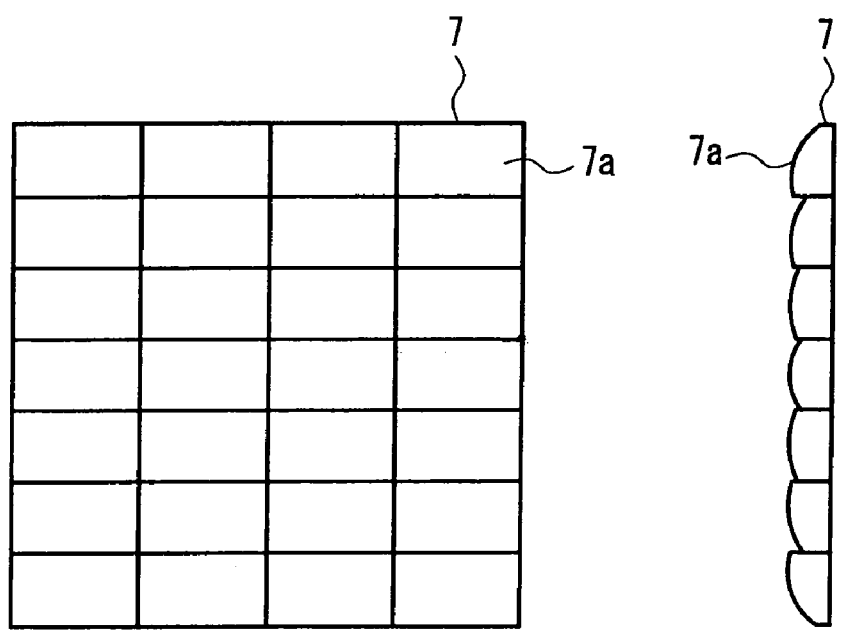
FIG. 5A is a front view of a second lens array in a projection display apparatus according to Embodiment 1 of the present invention.
FIG. 5B is a side view of the second lens array.

FIGS. 4A and 4B are a front view and a side view of the first lens array 6, respectively. FIGS. 5A and 5B are a front view and a side view of the second lens array 7, respectively. The first lens array 6 includes a two-dimensional array of first lenses 6a that are approximately similar to the display area of the DMD 10. The second lens array 7 includes a two-dimensional array of second lenses 7a that are the same as the first lenses 6a in shape. Each of the second lenses 7a is decentered appropriately so that the small beams that have passed through the corresponding first lenses 6a are superimposed on the DMD 10.

In this example, the second lenses 7a of the second lens array 7 have the same shape as that of the first lenses 6a. However, the second lenses are not limited thereto. For example, each of the first lenses 6a may be decentered, and the second lenses with different aperture shapes may be combined with the first lenses 6a.

Alternatively, a lens with positive power may be located close to the exit side of the second lens array 7 instead of decentering the second lenses 7a, thus providing the superimposition effect.

The optical path of light emanating from the illumination system 8 is bent by the reflection mirror 9, and then the light passes through the planoconvex lens 11 and enters the DMD 10.

The reflection mirror 9 is a plane mirror and is arranged so that an optical axis 8a of the illumination system 8 and an optical axis 12a of the projection lens 12 are skew lines. Moreover, the reflection mirror 9 is arranged so that when viewed from the direction perpendicular to both optical axes 8a, 12a (i.e., the y-axis direction) as shown in FIG. 1, an apparent point of intersection P of the optical axes 8a, 12a is located between the planoconvex lens 11 and the projection lens 12.

The inclination angle of small mirrors on the DMD 10 is ±10 degrees, and the reflection direction of incident light is controlled by changing the inclination angle. This control is synchronized with rotation of the rotating color filter 4, and optical images of red, green, and blue are superimposed, so that a full color image can be displayed.

The maximum converging angle of illumination light is about 10 degrees. The reflection mirror 9 is arranged so that the illumination light enters the plane of the DMD 10 at a bearing angle (an angle θ between the incident light and the short side of the DMD 10 when viewed from the direction of a normal to the DMD 10, as shown in FIG. 2) of 45 degrees and at an incident angle of 20 degrees.

The planoconvex lens 11 transmits both the incident light and the exit light of the DMD 10, is arranged so that a central axis (a normal passing through the center of an effective portion of the DMD 10) 10a of the DMD 10 and the optical axis 12a of the projection lens 12 are coaxial, and allows an exit pupil 8b (the exit plane of the second lens array 7 in FIG. 1) of the illumination system 8 to be conjugated with an entrance pupil 12b of the projection lens 12.

The planoconvex lens 11 directs light that has passed through the exit pupil 8b toward the DMD 10, and at the same time efficiently directs the reflected light from the ON state of the DMD 10 toward the entrance pupil 12b.

The projection lens 12 has an F number of 2.88 (the maximum converging angle is 10 degrees), directs the reflected light in the ON state of the DMD 10 toward a screen (not shown), and displays a large-screen full color image on the screen.

In the projection display apparatus of this embodiment as shown in FIGS. 1 to 3, the power of the planoconvex lens 11 and an air gap between the planoconvex lens 11 and the projection lens 12 are set appropriately, so that the DMD 10 and the projection lens 12 can be arranged coaxially without using any expensive component such as a TIR prism.

Moreover, the optical axis 8a of the illumination system 8 and the optical axis 12a of the projection lens 12 are skew lines. Thus, it is possible to eliminate mechanical contact or interference between the optical components and utilize the space efficiently.

Further, the reflection mirror 9 is arranged appropriately between the planoconvex lens 11 and the projection lens 12 so that when viewed from the y-axis direction, the apparent point of intersection of the optical axis 8a of the illumination system 8 and the optical axis 12a of the projection lens 12 is located between the planoconvex lens 11 and the projection lens 12. Thus, it is possible to reduce the size of the apparatus.

The above configuration can provide an inexpensive compact projection display apparatus that can achieve right projection by using a reflection-type light modulator.

EMBODIMENT 2

Figure 6:
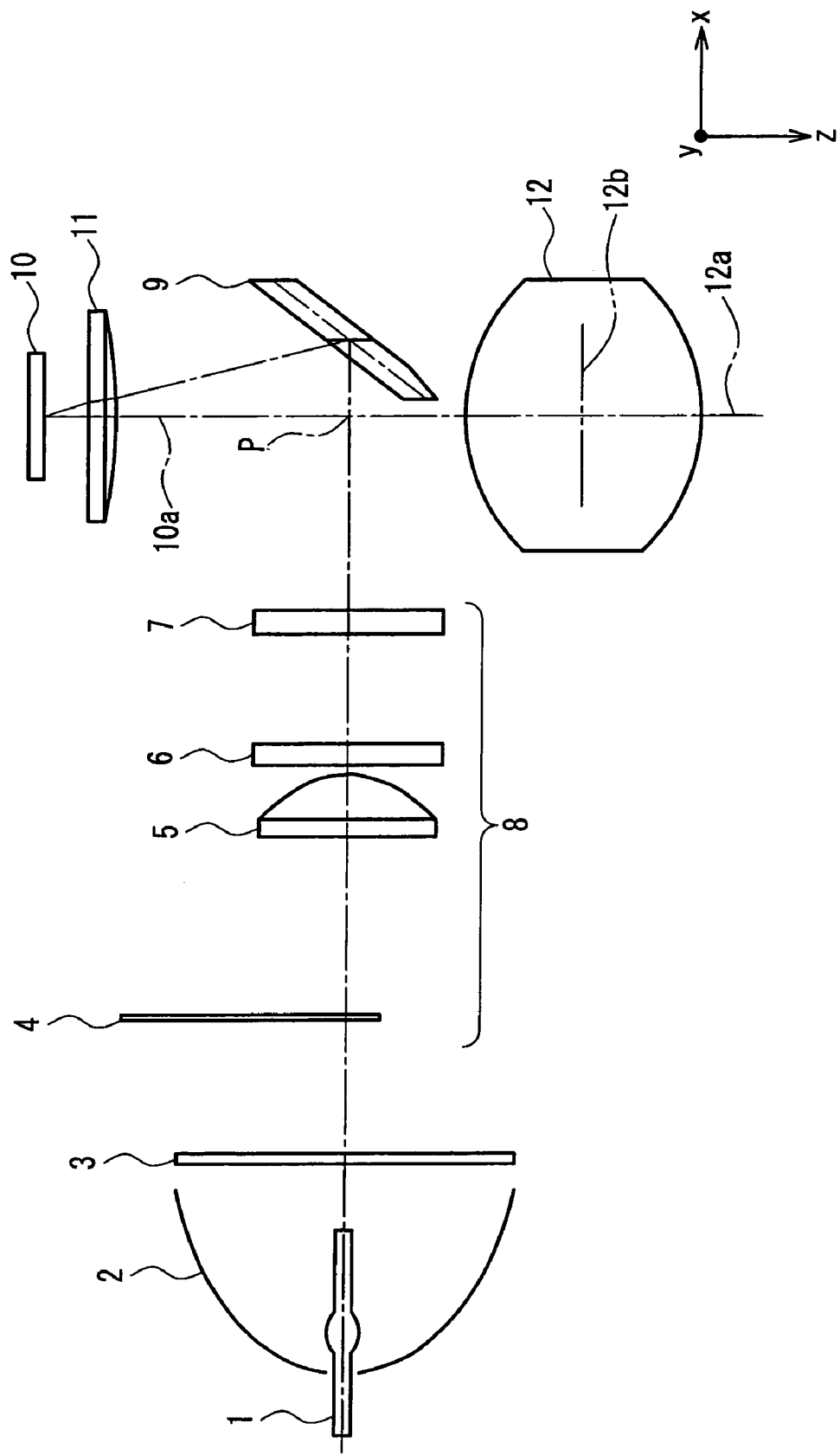
FIG. 6 is an x-z plan view showing the configuration of a projection display apparatus according to Embodiment 2 of the present invention.
Figure 7:
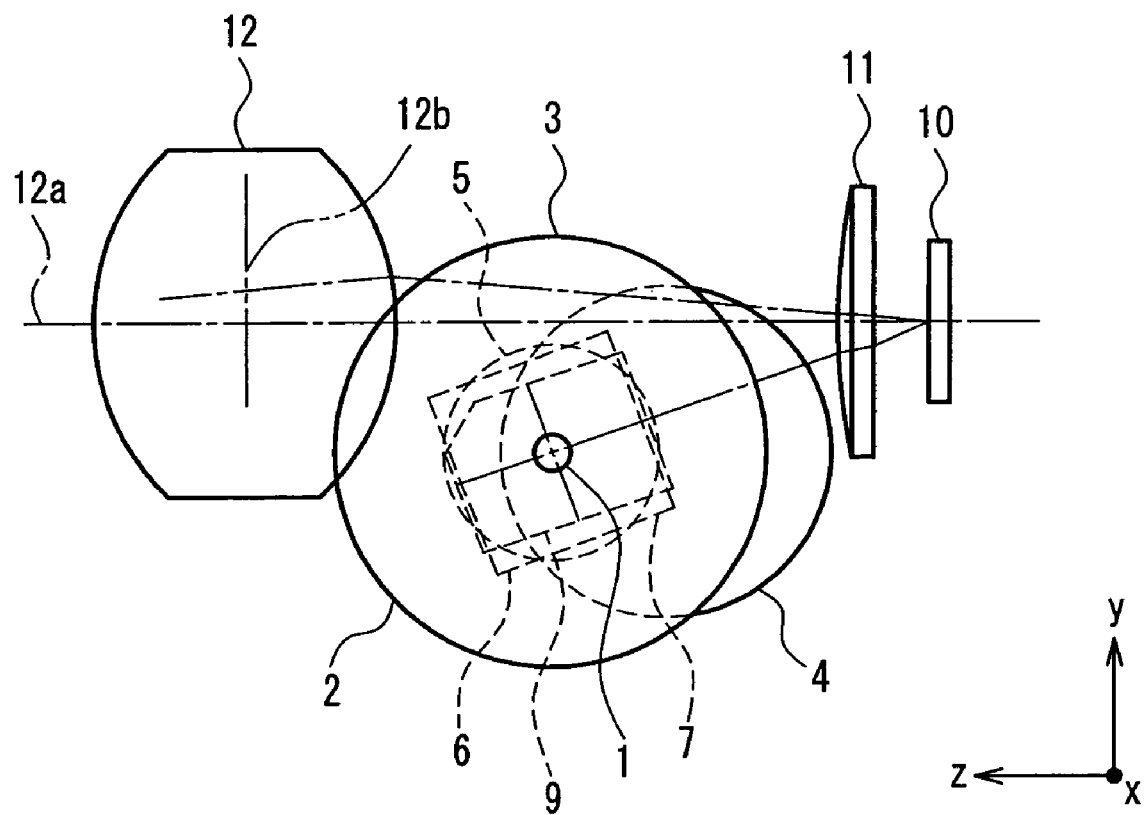
FIG. 7 is a y-z plan view showing the configuration of a projection display apparatus according to Embodiment 2 of the present invention.

FIG. 6 shows the configuration of a projection display apparatus of Embodiment 2 of the present invention. When an xyz rectangular coordinate system is defined as shown in the drawings, FIG. 6 illustrates the configuration taken along the x-z plane. Similarly, FIG. 7 illustrates the configuration taken along the y-z plane.

The basic operations from the light source 1 to the projection lens 12 are the same as those in Embodiment 1, and therefore members having the identical function are denoted by the same reference numerals and the explanation will not be repeated.

The distinct feature of this embodiment versus Embodiment 1 is that the entrance pupil 12b is eccentric with respect to the optical axis 12a of the projection lens 12. In this embodiment, the entrance pupil 12b is shifted in the direction of the minor axis (y-axis) of the DMD 10, as shown in FIG. 7. Therefore, when the inclination angle of small mirrors on the DMD 10 is ±10 degrees, the maximum incident angle of illumination light is 10 degrees, and the illumination light enters the plane of the DMD 10 at an incident angle of 24.5 degrees and a bearing angle of 40 degrees.

The projection lens 12 has an F number of 2.0 (the maximum converging angle is 14.5 degrees), and the entrance pupil 12b has an effective F number of 2.85.

The projection lens 12 contains a lens stop with a similar shape to the entrance pupil 12b and has a focus adjusting mechanism that can move only along the optical axis 12a of the projection lens 12 without rotating around the optical axis 12a due to the eccentricity of the entrance pupil 12b.

The entrance pupil 12b may be shifted in the direction in which the angle between incident light and exit light of the DMD 10 becomes larger. This increases the separation angle between the illumination light traveling from the reflection mirror 9 to the planoconvex lens 11 and the projection light traveling from the planoconvex lens 11 to the projection lens 12. Therefore, reflection mirror 9 can be located closer to the planoconvex lens 11. Consequently, an air gap between the planoconvex lens 11 and the projection lens 12 can be reduced, and thus the size of the apparatus also can be reduced.

The maximum converging angle required for the projection lens 12 as well as the separation angle between the illumination light and the projection light increase with the amount of eccentricity of the entrance pupil 12b. Therefore, a projection lens having a small F number is necessary. It is desirable that the amount of eccentricity is set appropriately in view of the set size, the F number of a projection lens, or the like.

This embodiment shows an example in which the bearing angle of the illumination light is 40 degrees, and the entrance pupil 12b is shifted in the direction of the minor axis (y-axis) of the DMD 10. Although the present invention is not limited thereto, it is preferable to set the bearing angle of the illumination light between the direction of inclination of the small mirrors on the DMD 10 (i.e., in this embodiment, the direction that tilts 45 degrees from the minor axis (y-axis) of the DMD 10) and the minor axis (y-axis) of the DMD 10.

In the projection display apparatus of this embodiment as shown in FIGS. 6 and 7, the power of the planoconvex lens 11 and an air gap between the planoconvex lens 11 and the projection lens 12 are set appropriately, so that the DMD 10 and the projection lens 12 can be arranged coaxially without using any expensive component such as a TIR prism.

Moreover, the optical axis 8a of the illumination system 8 and the optical axis 12a of the projection lens 12 are skew lines. Thus, it is possible to eliminate mechanical contact or interference between the optical components and utilize the space efficiently.

Further, the reflection mirror 9 is arranged appropriately between the planoconvex lens 11 and the projection lens 12 so that when viewed from the y-axis direction, the apparent point of intersection P of the optical axis 8a of the illumination system 8 and the optical axis 12a of the projection lens 12 is located between the planoconvex lens 11 and the projection lens 12. Thus, it is possible to reduce the size of the apparatus.

Further, appropriate eccentricity of the entrance pupil 12b can reduce a gap between the planoconvex lens 11 and the projection lens 12.

The above configuration can provide an inexpensive projection display apparatus that is more compact than the apparatus in Embodiment 1 and can achieve right projection by using a reflection-type light modulator.

EMBODIMENT 3

Figure 8:
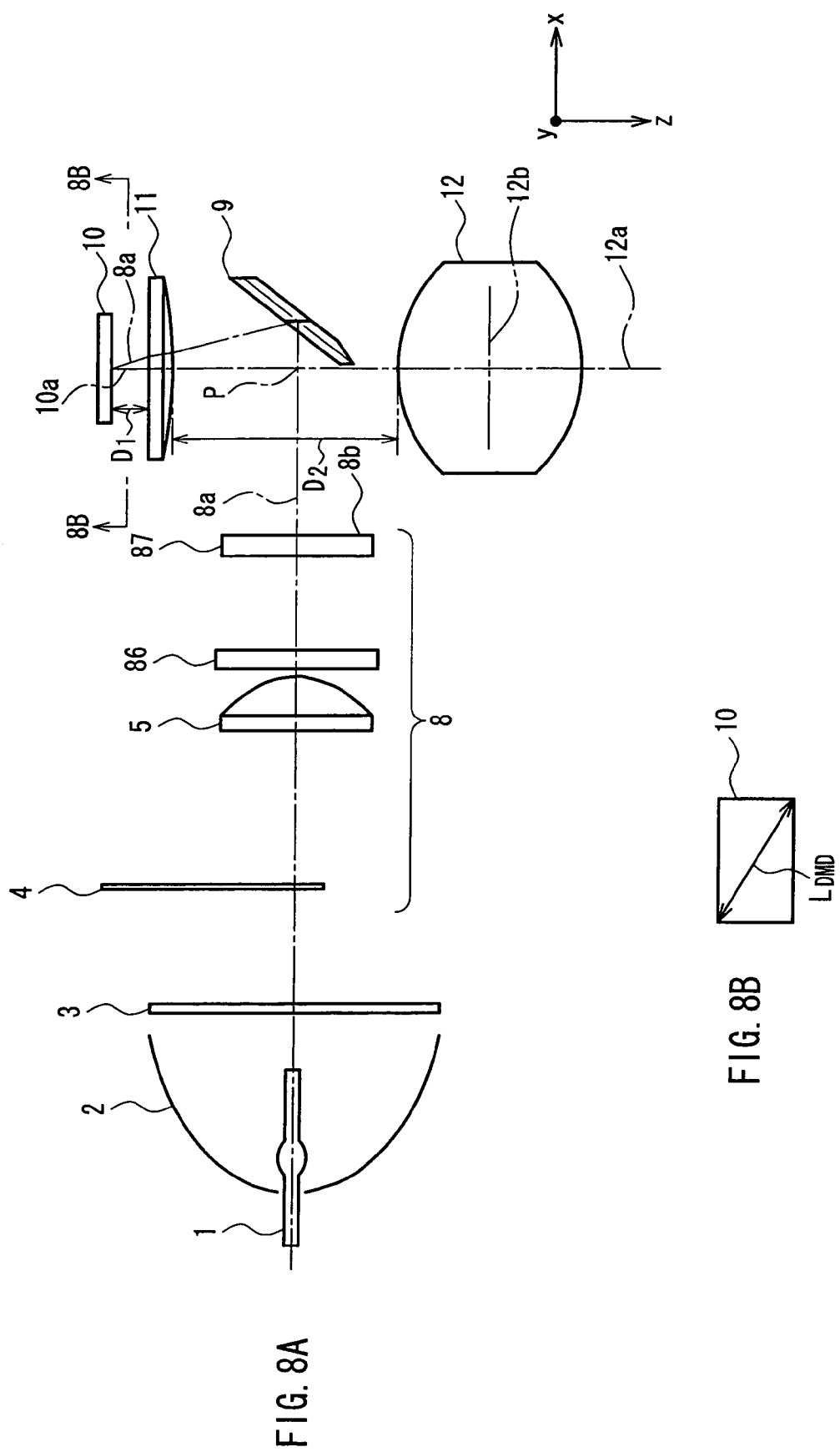
FIG. 8A is an x-z plan view showing the configuration of a projection display apparatus according to Embodiment 3 of the present invention.
FIG. 8B is a front view of a DMD when viewed from the direction of the arrow on the line 8B—8B in FIG. 8A.

FIG. 8A shows the configuration of a projection display apparatus of Embodiment 3 of the present invention. When an xyz rectangular coordinate system is defined as shown in the drawings, FIG. 8A illustrates the configuration taken along the x-z plane. Similarly, FIG. 9 illustrates the configuration taken along the y-z plane.

FIG. 8B is a front view of the DMD 10 when viewed from the direction of the arrow on the line 8B—8B in FIG. 8A.

The basic operations from the light source 1 to the projection lens 12 are the same as those in Embodiments 1 and 2, and therefore members having the identical function are denoted by the same reference numerals and the explanation will not be repeated.

Figure 9:
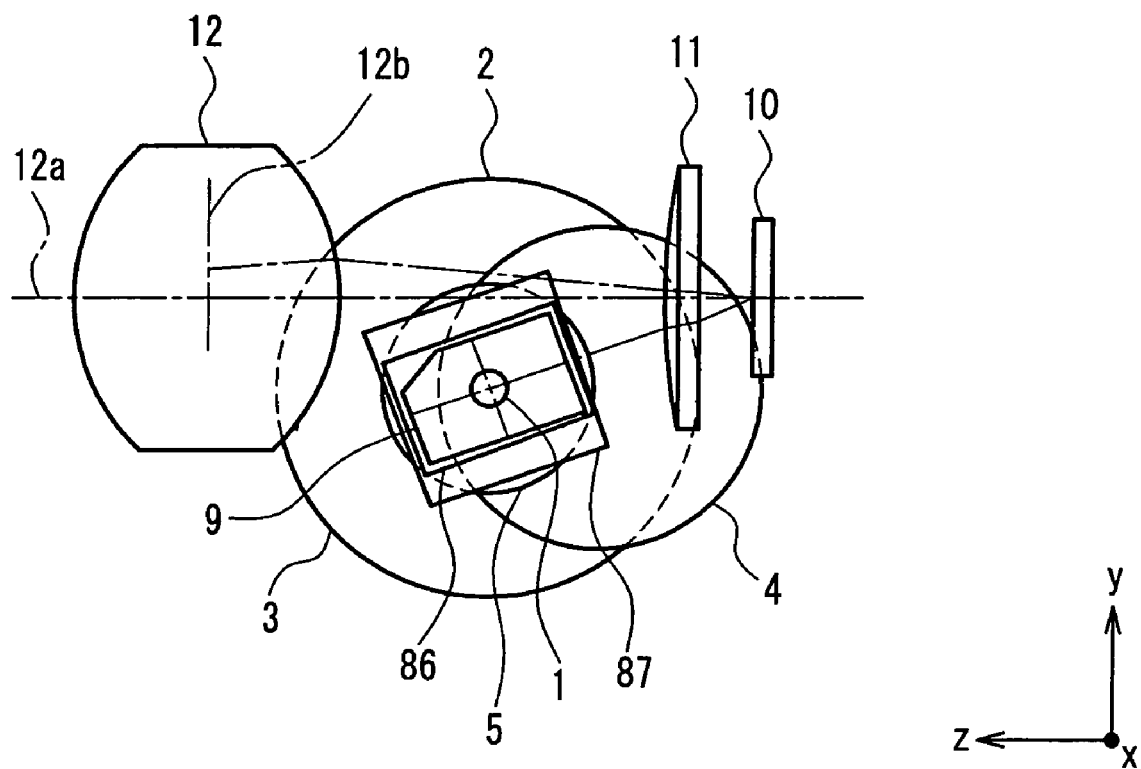
FIG. 9 is a y-z plan view showing the configuration of a projection display apparatus according to Embodiment 3 of the present invention.

Like Embodiment 2, this embodiment allows the entrance pupil 12b to be shifted in the direction of the minor axis (y-axis) of the DMD 10, as shown in FIG. 9.

The distinct feature of this embodiment versus Embodiment 1 is that the entrance pupil 12b is eccentric with respect to the optical axis 12a of the projection lens 12, and at the same time a converging angle in the eccentric direction of the entrance pupil 12b is smaller than a converging angle in the direction perpendicular to the eccentric direction.

Figure 10B:
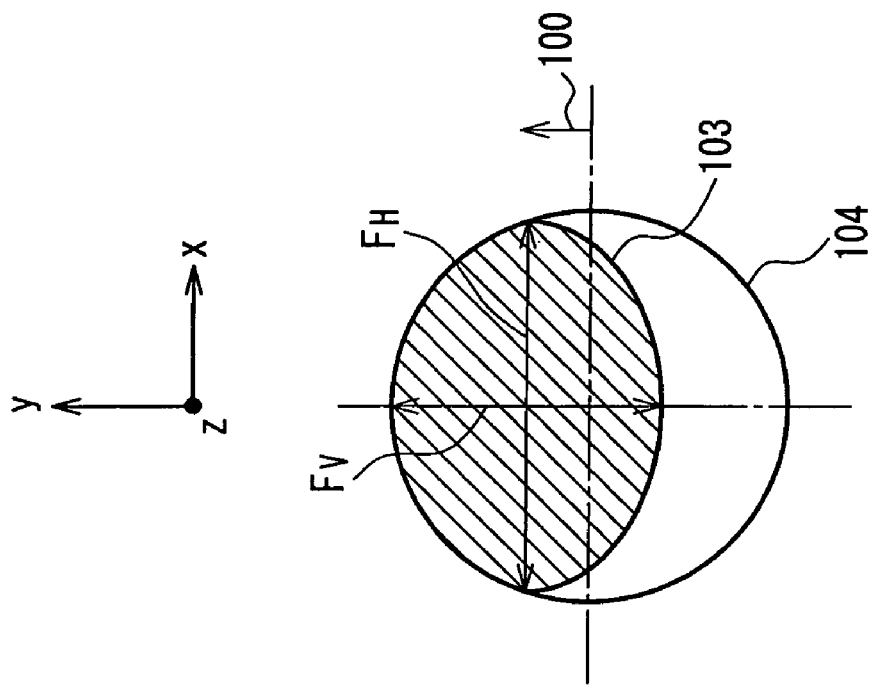
FIG. 10B is a schematic diagram for illustrating the position and shape of an entrance pupil of a projection lens in a projection display apparatus according to Embodiment 3 of the present invention.
Figure 10A:
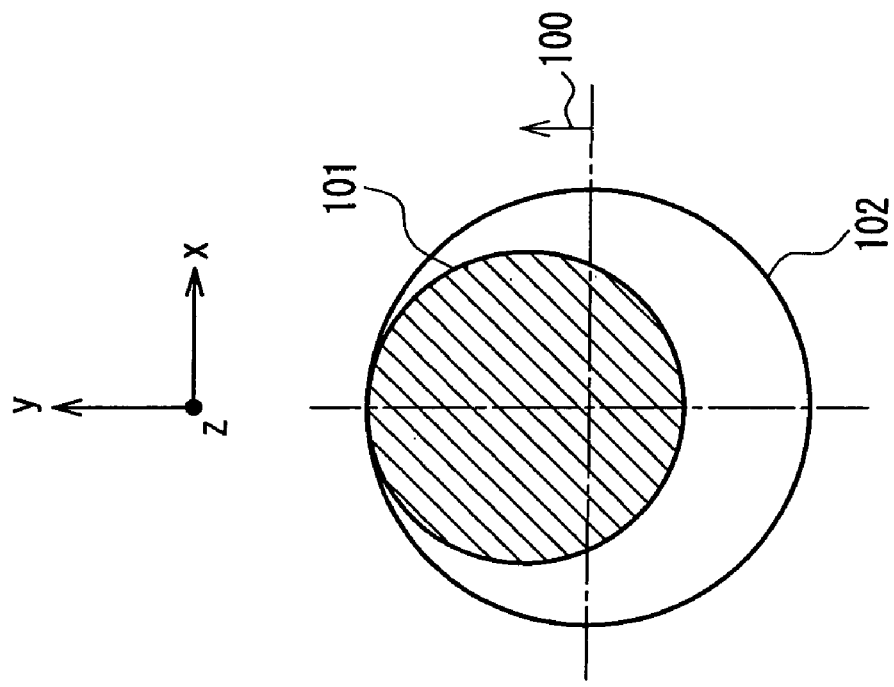
FIG. 10A is a schematic diagram for illustrating the position and shape of an entrance pupil of a projection lens in a projection display apparatus according to Embodiment 2 of the present invention.

FIGS. 10A and 10B are schematic diagrams, each showing the relationship between the range of a maximum converging angle and the entrance pupil of the projection lens 12. FIG. 10A shows an entrance pupil 101 and a range 102 of the maximum converging angle required for the projection lens 12 when a converging angle in the eccentric direction 100 (y-axis direction) is the same as a converging angle in the direction (x-axis direction) perpendicular to the eccentric direction (corresponding to Embodiment 2). FIG. 10B shows an entrance pupil 103 and a range 104 of the maximum converging angle required for the projection lens 12 when a converging angle in the eccentric direction 100 (y-axis direction) is smaller than a converging angle in the direction (x-axis direction) perpendicular to the eccentric direction (corresponding to Embodiment 3). In either case, the amount of eccentricity and the area of the entrance pupil (the effective F number, indicated by the diagonally shaded portion) are the same.

In the entrance pupil 103, $F_V$ represents a maximum length in the eccentric direction 100 (y-axis direction), and $F_H$ represents a maximum length in the direction (x-axis direction) perpendicular to the eccentric direction.

As can be seen from the comparison of FIGS. 10A and 10B, when the eccentric entrance pupils have the same effective F number, the range of a maximum converging angle of the projection lens can be reduced more by making a converging angle in the eccentric direction 100 smaller than a converging angle in the direction perpendicular to the eccentric direction. In other words, the same performance can be achieved with a projection lens having a small maximum converging angle (i.e., a large F number).

Moreover, a smaller converging angle in the eccentric direction 100 leads to a decrease in interference between the illumination light traveling from the reflection mirror 9 to the planoconvex lens 11 and the projection light traveling from the planoconvex lens 11 to the projection lens 12. Therefore, the reflection mirror 9 can be located closer to the planoconvex lens 11. Consequently, an air gap between the planoconvex lens 11 and the projection lens 12 can be reduced.

To obtain an exit pupil 8b of the illumination system 8 that matches with the entrance pupil 12b, e.g., a first lens array 86 having a shape as shown in FIGS. 11A, 11B and a second lens array 87 having a shape as shown in FIGS. 12A, 12B may be used.

FIG. 11A is a front view of the first lens array 86, and FIG. 11B is a cross-sectional view taken along the line 11B—11B in FIG. 11A. Each of first lenses 86a of the first lens array 86 is decentered so that beams that have passed through the first lenses 86a are focused on the corresponding second lenses 87a of the second lens array 87.

FIG. 12A is a front view of the second lens array 87, and FIG. 12B is a cross-sectional view taken along the line 12B—12B in FIG. 12A. Each of the second lenses 87a of the second lens array 87 is decentered appropriately so that the beams that have passed through the corresponding first lenses 86a are superimposed on the DMD 10.

The second lens array 87 may be set so that the direction of the minor axis 87b substantially coincides with the eccentric direction of the entrance pupil 12b, and the dimensions in the respective directions of the minor axis 87b and the major axis 87c match with the converging angles of the projection lens 12 in the corresponding directions.

The suitable effects of the present invention may be obtained by satisfying the following formulas (1) and (2):

$$0.5 \times L_{DMD} \leq D_1 \leq L_{DMD} \tag{1}$$

$$0.3\,f \leq D_2 \leq f \tag{2}$$

where $L_{DMD}$ represents a diagonal length (FIG. 8B) of an effective display area of the DMD 10, $D_1$ represents an air gap between the DMD 10 and the planoconvex lens 11, $D_2$ represents an air gap between the planoconvex lens 11 and the projection lens 12, and f represents a focal length of the planoconvex lens 11.

For the formula (1), when $D_1$ is less than the lower limit, unwanted reflected light that occurs between the DMD 10 and the planoconvex lens 11 is increased and adversely affects the image quality. When $D_1$ is more than the upper limit, an effective diameter of the planoconvex lens 11 is increased, so that the size of the apparatus is increased.

For the formula (2), when $D_2$ is less than the lower limit, it becomes difficult to arrange the reflection mirror 9. When $D_2$ is more than the upper limit, a back focal length of the projection lens 12 is increased, causing problems such that aberration is not corrected easily, and the size of the apparatus is increased.

In both Embodiment 1 (FIGS. 1 to 3) and Embodiment 2 (FIGS. 6 and 7), the suitable effects also can be obtained by satisfying the above formulas (1) and (2).

It is further preferable to satisfy the following formulas (3) and (4):

$$2 \times \theta_{DMD} \leq \theta_i \leq 2.5 \times \theta_{DMD} \tag{3}$$

$$0.35 \leq F_V/F_H \leq 0.95 \tag{4}$$

where $\theta_{DMD}$ represents the inclination angle of small mirrors on the DMD 10, $\theta_i$ represents the incident angle of illumination light (corresponding to the optical axis 8a of the illumination system 8 in this embodiment) with respect to the central axis 10a of the DMD 10, $F_V$ represents the maximum length of the entrance pupil 12b in the eccentric direction, and $F_H$ represents the maximum length of the entrance pupil 12b in the direction perpendicular to the eccentric direction.

For the formula (3), when $\theta_i$ is less than the lower limit, the separation angle between incident light and exit light of the DMD 10 becomes smaller, making it difficult to arrange the reflection mirror 9. When $\theta_i$ is more than the upper limit, the maximum converging angle required for the projection lens 12 becomes larger, thus increasing the size of the projection lens 12.

For the formula (4), when $F_V/F_H$ is less than the lower limit, the entrance pupil area (where a light beam passes through) is reduced relatively in the range of a maximum converging angle of the projection lens 12, so that a wasted region is increased. When $F_V/F_H$ is more than the upper limit, the maximum converging angle required for the projection lens 12 becomes larger, thus increasing the size of the projection lens 12.

In Embodiment 2 as shown in FIGS. 6 and 7, the suitable effects also can be obtained by satisfying the above formula (3).

In the configuration as shown in FIGS. 8A and 8B, $L_{DMD}$=20.3 mm, $D_1$=10 mm, $D_2$=40 mm, f=100 mm, $\theta_{DMD}$=10 degrees, $\theta_i$=24 degrees, and $F_V/F_H$=0.7. Each of the mirrors on the DMD 10 is inclined in the direction at 45 degrees with respect to the minor axis (y-axis). The illumination light enters the DMD 10 at a bearing angle of 40 degrees measured from the minor axis of the DMD 10.

The F number of the projection lens 12 is 2.1. The projection lens 12 contains a lens stop with similar shape to the entrance pupil 12*b* and has a focus adjusting mechanism that can move only along the optical axis 12*a* of the projection lens 12 without rotating around the optical axis 12*a* due to the eccentricity of the entrance pupil 12*b*.

It is preferable to set the eccentric direction of the entrance pupil 12*b* so that the bearing angle of the illumination light is between the direction of the minor axis of the DMD 10 and the direction of inclination of the small mirrors.

In the projection display apparatus of this embodiment as shown in FIGS. 8A, 8B, and 9, the power of the planoconvex lens 11 and an air gap between the planoconvex lens 11 and the projection lens 12 are set appropriately, so that the DMD 10 and the projection lens 12 can be arranged coaxially without using any expensive component such as a TIR prism.

Moreover, the optical axis 8*a* of the illumination system 8 and the optical axis 12*a* of the projection lens 12 are skew lines. Thus, it is possible to eliminate mechanical contact or interference between the optical components and utilize the space efficiently.

Further, the reflection mirror 9 is arranged appropriately between the planoconvex lens 11 and the projection lens 12 so that when viewed from the y-axis direction, the apparent point of intersection P of the optical axis 8*a* of the illumination system 8 and the optical axis 12*a* of the projection lens 12 is located between the planoconvex lens 11 and the projection lens 12. Thus, it is possible to reduce the size of the apparatus.

Further, the entrance pupil 12*b* is eccentric appropriately, and a converging angle in the eccentric direction is smaller than a converging angle in the direction perpendicular to the eccentric direction, so that the projection lens 12 having a small converging angle (i.e., a large F number) can be used. At the same time, an air gap between the planoconvex lens 11 and the projection lens 12 also can be reduced.

The above configuration can provide an inexpensive projection display apparatus that is more compact than the apparatuses in Embodiments 1 and 2 and can achieve right projection by using a reflection-type light modulator.

EMBODIMENT 4

Figure 13:
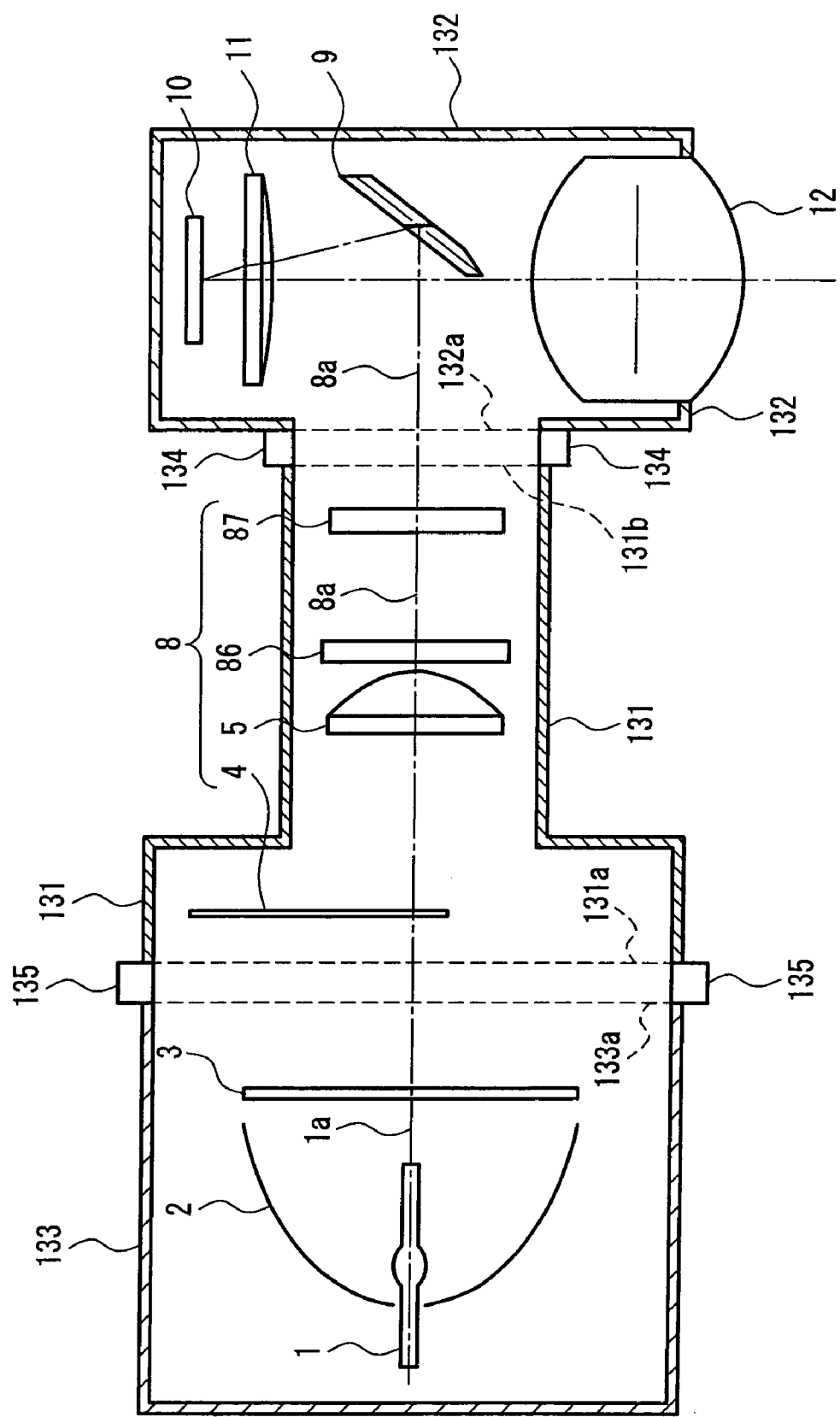
FIG. 13 is an x-z plan view showing the configuration of a projection display apparatus according to Embodiment 4 of the present invention.

FIG. 13 shows the configuration of a projection display apparatus of Embodiment 4 of the present invention. Reference numeral 131 denotes a first cabinet, 132 denotes a second cabinet, 133 denotes a third cabinet, and 134 denotes a coupling member. The basic operations from the light source 1 to the projection lens 12 are the same as those in Embodiment 3, and therefore members having the identical function are denoted by the same reference numerals and the explanation will not be repeated.

The first cabinet 131 holds the illumination system 8 and includes an entrance window 131*a* through which emitted light of the lamp 1 enters and an exit window 131*b* through which illumination light emanates.

The second cabinet 132 holds the reflection mirror 9, the DMD 10, the planoconvex lens 11, and the projection lens 12 and includes an entrance window 132*a* through which the illumination light enters.

The third cabinet 133 holds the lamp 1, the concave mirror 2, and the UV-IR cut filter 3 and includes an exit window 133*a* through which the emitted light of the lamp 1 emanates.

The coupling member 134 couples the exit window 131*b* of the first cabinet 131 to the entrance window 132*a* of the second cabinet 132 so that the optical axes 8*a* of the illumination light substantially coincide. The coupling member 134 includes a three-directional (x, y, and z) adjusting mechanism.

A coupling member 135 couples the exit window 133*a* of the third cabinet 133 to the entrance window 131*a* of the first cabinet 131 so that the optical axis 1*a* of the lamp 1 and the optical axis 8*a* of the illumination light substantially coincide. The coupling member 135 includes a three-directional (x, y, and z) adjusting mechanism.

A projection optical system generally requires higher accuracy of components than an illumination optical system does. The projection display apparatus in FIG. 13 allows the light source, the illumination optical system, and the projection optical system to be held in different cabinets. Therefore, this apparatus has the advantage of selecting appropriate processing accuracy or materials for each of the cabinets. For example, materials and processing methods may be applied with an emphasis on cost for the first cabinet 131, accuracy for the second cabinet 132, and heat resistance for the third cabinet 133.

Moreover, the optical components are divided into the cabinets to form units, thereby facilitating maintenance.

The coupling members 134, 135 include an adjusting mechanism, so that the adjusting mechanism of each optical component, which has been needed for a conventional apparatus, can be removed.

This embodiment shows an example in which the projection display apparatus is divided into three cabinets. However, the first cabinet 131 and the third cabinet 133 may be formed as a common cabinet.

The above configuration can provide an inexpensive projection display apparatus that can facilitate the maintenance of optical components.

FIG. 13 shows the projection display apparatus provided with the optical system of Embodiment 3. However, the present invention is not limited thereto, and the projection display apparatus may include, e.g., the optical system of Embodiment 1 or 2.

EMBODIMENT 5

Figure 14B:
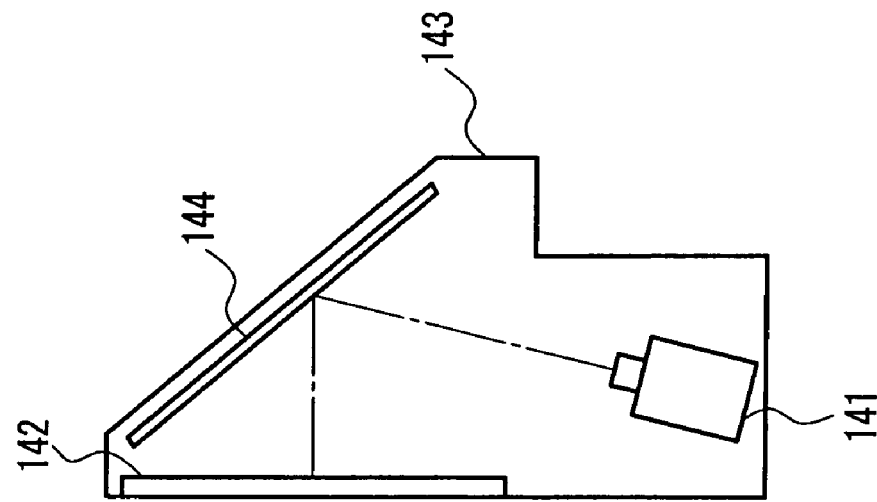
FIG. 14B is a perspective side view of the apparatus.
Figure 14A:
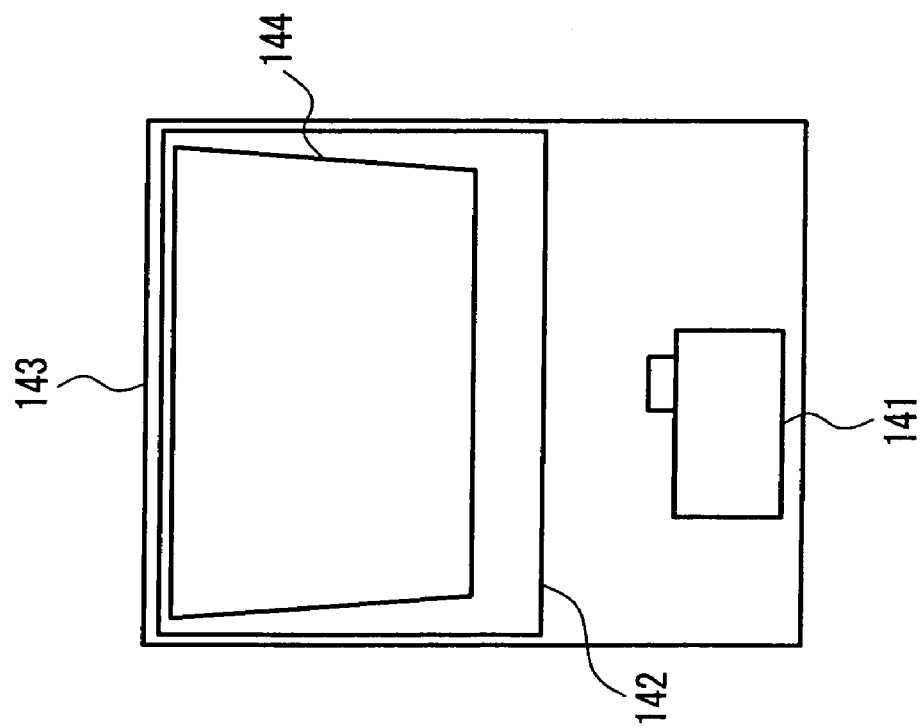
FIG. 14A is a perspective front view of a rear-projection display apparatus according to Embodiment 5 of the present invention.

FIG. 14A is a perspective front view of a rear-projection display apparatus of Embodiment 5 of the present invention, and FIG. 14B is a perspective side view of the apparatus. Reference numeral 141 is a projection display apparatus, 142 is a transmission-type screen, and 143 is a cabinet. The transmission-type screen 142 is held by the cabinet 143, in which the projection display apparatus 141 according to Embodiment 4 is arranged.

Light emanating from the projection lens of the projection display apparatus 141 is reflected by a reflection mirror 144 and enters the transmission-type screen 142.

The transmission-type screen 142 is formed, e.g., of a Fresnel lens and a lenticular lens. The focal length of the Fresnel lens is substantially equal to the optical path length from the Fresnel lens to the projection lens, and incident light is refracted appropriately and transmitted toward the front of the screen 142. The viewer can observe an image that is magnified and projected by the projection display apparatus 141 through the transmission-type screen 142.

Using the projection display apparatus 141 of the present invention eliminates the need for offset of the Fresnel lens, so that a large-screen image with high quality and high uniformity in resolution or brightness can be achieved. Moreover, the whole cabinet can be made compact because the apparatus is small.

The above configuration can provide an inexpensive compact rear-projection display apparatus that can perform high-quality image display by using a reflection-type light modulator.

EMBODIMENT 6

Figure 15:
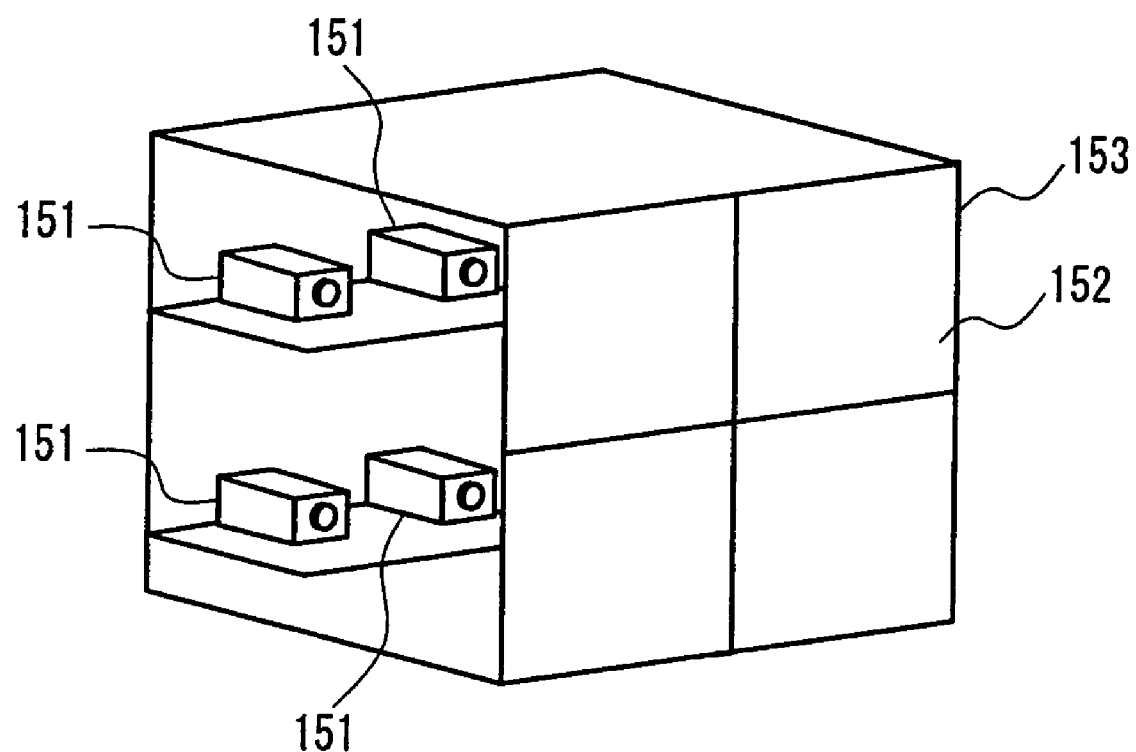
FIG. 15 is a perspective view of a rear-projection display apparatus according to Embodiment 6 of the present invention.
Figure 16A:
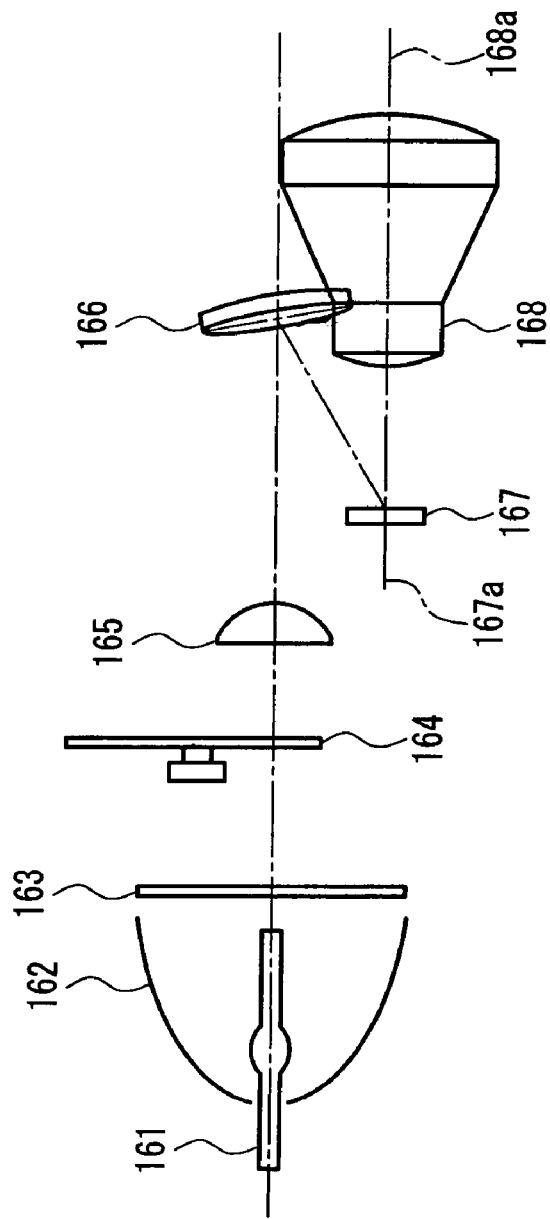
FIG. 16A is a top view showing the configuration of a conventional projection display apparatus that uses a DMD as a spatial light modulator.
Figure 16B:
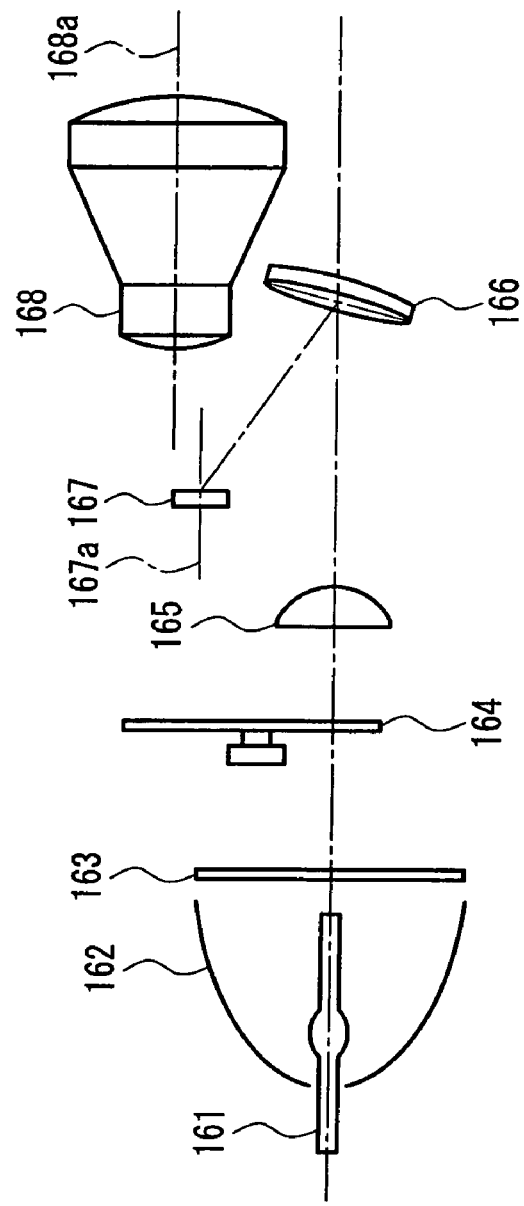
FIG. 16B is a side view of the apparatus.
Figure 17B:
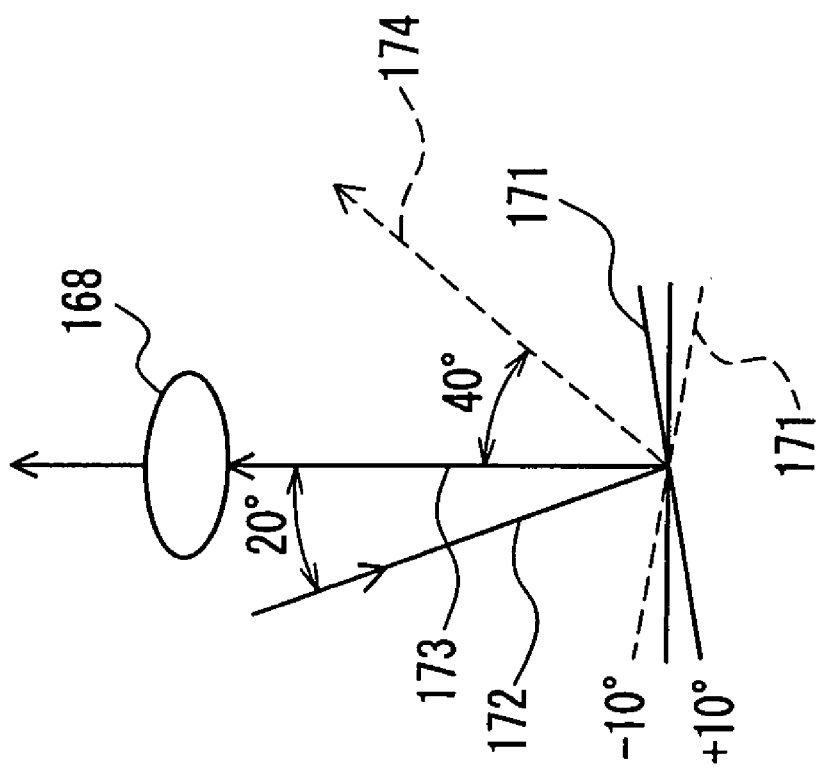
FIG. 17B is a schematic side view for illustrating the principle of operation of the DMD.
Figure 17A:
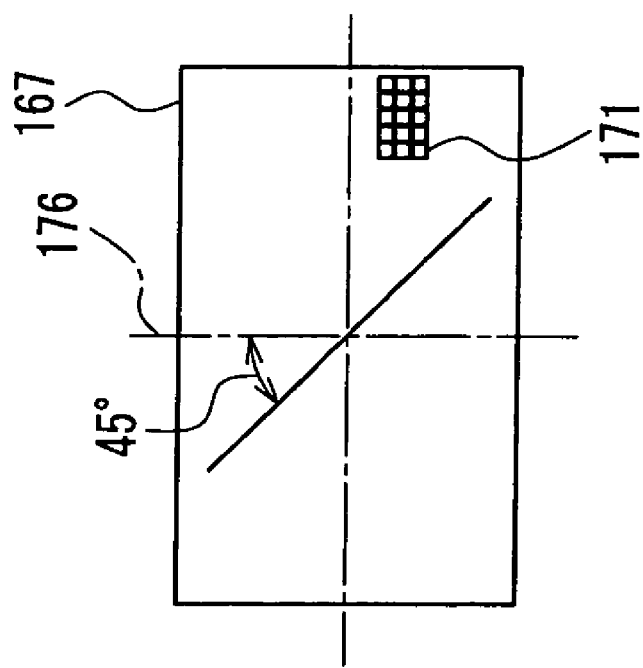
FIG. 17A is a schematic front view of a DMD.

FIG. 15 is a perspective view of a rear-projection display apparatus of Embodiment 6 of the present invention. Reference numeral 151 is a projection display apparatus, 152 is a transmission-type screen, and 153 is a cabinet. Four transmission-type screens 152 are held by the cabinet 153, in which the same number of projection display apparatuses according to Embodiment 4 are arranged in one-to-one correspondence with the screens 152.

When images of the projection display apparatuses 151 are arranged to display a multi-screen, it is preferable to reduce a difference in brightness or resolution between the screens located on both sides of the boundary of each screen.

In this embodiment, using the projection display apparatuses 151 of the present invention eliminates the need for offset of a Fresnel lens, so that display images in each of the screens have resolution or brightness performance that is rotationally symmetrical with respect to the screen center. Therefore, when these images are arranged to form a multi-screen, a difference in brightness or resolution between the screens located on both sides of the boundary of each screen can be made extremely small except for variations in the individual screens.

The above configuration can provide a rear-projection display apparatus that can achieve high image quality, a small difference in image quality between the screens, and multi-screen display by using a plurality of projection display apparatuses, each of which includes a reflection-type light modulator.

In FIGS. 14A, 14B and 15, any of the projection display apparatuses according to Embodiments 1 to 4 may be used as the projection display apparatuses 141, 151, and in either case the same effect can be obtained.

A field stop for cutting off unwanted light may be provided at the aperture on the exit side of the projection lens. This makes it possible to achieve a high-contrast display image.

In Embodiments 1 to 4, two lens arrays are used in the illumination system 8. However, an optical integrator element such as a glass rod also may be used. A condenser lens also may be used to produce illumination light instead of the optical integrator element.

In Embodiments 1 to 4, the plane mirror 9 is used as a reflection system. However, a curved mirror (e.g., spherical, aspherical, free-form surface, or parabolic) may be used as well.

In Embodiments 1 to 4, the DMD 10 is used as a reflection-type light modulator. However, any component may be used as long as it can spatially modulate incident light by causing a change in the incident light such as polarization or diffraction.

In Embodiments 1 to 4, the planoconvex lens 11 is used as a lens element. However, the convex surface of a lens is not limited to the orientation as described in the embodiments. Also, for example, a double-convex lens or gradient index lens may be used instead of the planoconvex lens.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

The invention claimed is:

1. A projection display apparatus comprising:
a light source;
an illumination system for condensing light emitted from the light source into illumination light;
a reflection system for bending an optical path of the illumination light;
a reflection-type light modulator that is illuminated with the illumination light bent by the reflection system and forms an optical image in accordance with an image signal;
a projection system for projecting the optical image formed on the reflection-type light modulator; and
a lens element arranged on optical paths of incident light and exit light of the reflection-type light modulator,
wherein an optical axis of the illumination system and an optical axis of the projection system are skew lines,
the lens element allows an exit pupil of the illumination system to be conjugated substantially with an entrance pupil of the projection system,
the entrance pupil is eccentric with respect to the optical axis of the projection system, and
the projection system comprises a focus adjusting mechanism that does not rotate around the optical axis of the projection system.

2. The projection display apparatus according to claim 1, wherein a converging angle in the eccentric direction of the projection system is smaller than a converging angle in a direction perpendicular to the eccentric direction.

3. The projection display apparatus according to claim 1, wherein when viewed from a direction perpendicular to both the optical axis of the illumination system and the optical axis of the projection system, an apparent point of intersection of the optical axis of the illumination system and the optical axis of the projection system is located between the lens element and the projection system.

4. The projection display apparatus according to claim 1, wherein the optical axis of the reflection-type light modulator coincides with the optical axis of the projection system.

5. The projection display apparatus according to claim 1, further comprising a first cabinet and a second cabinet,
wherein the first cabinet holds the illumination system and comprises an exit window through which light emanating from the illumination system passes,
the second cabinet holds the reflection system, the reflection-type light modulator, the lens element, and the projection system and comprises an entrance window through which light from the illumination system enters, and
the exit window and the entrance window are coupled together.

6. The projection display apparatus according to claim 5, further comprising a coupling member between the exit window and the entrance window,
wherein the coupling member comprises an adjusting mechanism for adjusting an optical axis or optical path length.

7. The projection display apparatus according to claim 1, wherein the illumination system comprises an optical integrator element.

8. The projection display apparatus according to claim 7, wherein the optical integrator element comprises two lens array plates, and each of a plurality of lenses that constitute at least the lens array plate located closer to the light source is decentered appropriately.

9. A rear-projection display apparatus comprising:
the projection display apparatus according to claim 1;
a transmission-type screen for displaying an image projected by the projection display apparatus; and
a cabinet for housing the projection display apparatus and holding the transmission-type screen.

10. A rear-projection display apparatus comprising:
a plurality of projection display apparatuses according to claim 1;
transmission-type screens for displaying images projected by the projection display apparatuses; and
a cabinet for housing the projection display apparatuses and holding the transmission-type screens.

* * * * *